United States Patent [19]

Schuplin

[11] 3,737,128
[45] June 5, 1973

[54] CABLE SUPPORT CLIP

[75] Inventor: Jerome T. Schuplin, Parma Heights, Ohio

[73] Assignee: Fastway Fasteners Inc., Lorain, Ohio

[22] Filed: Oct. 20, 1971

[21] Appl. No.: 190,726

[52] U.S. Cl. ...................... 248/71, 85/5 R, 248/216
[51] Int. Cl. ............................................. F16b 15/02
[58] Field of Search .................. 248/71, 48.2; 85/67, 85/83, 84, 79, 82, 85, 80, 5 R; 174/164, 165, 166, 156, 157; 24/213 CS, 73 SA, 73 P

[56] References Cited

UNITED STATES PATENTS 3,252,677   5/1966   Raymond ............................. 85/5 R

FOREIGN PATENTS OR APPLICATIONS 1,444,165   5/1965   France ............................... 174/164
609,662     11/1960  Canada .............................. 248/71

*Primary Examiner*—Roy D. Frazier
*Assistant Examiner*—Rodney H. Bonck
*Attorney*—Isler & Ornstein

[57] ABSTRACT

A cable support clip is provided, which is especially adapted for securement in a blind hole in concrete, wood or other solid material. It is provided with flexible fins or like means which facilitate entry of the shank portions of the clip in the hole, and resist removal of the clip from the hole; has novel means for interlocking the shank portions together to prevent axial movement thereof relatively to each other, and is provided with means for avoiding distortion of or damage to the head of the clip or to the cable during insertion of the clip in the blind hole.

10 Claims, 7 Drawing Figures

PATENTED JUN 5 1973

3,737,128

INVENTOR.
JEROME T. SCHUPLIN
BY
Isler & Ornstein
ATTORNEYS

CABLE SUPPORT CLIP

This invention relates generally to cable support clips, but has reference more particularly to clips or fasteners of the type disclosed, for example, in the Orenick U.S. Pat. No. 3,157,377.

In the aforesaid patent, a clip is shown which is especially adapted for securing an electric cable or The like to a wall having a circular opening therein, the clip having complementary wall penetrating plugs adapted to be passed through the wall opening and to be interlocked with each other after such passage.

Such a clip, while of advantage in combination with a wall having a circular opening of the character described, is not adapted for use in a blind or bottomed support wall hole or opening, such, for example, as a blind hole in concrete, concrete block, wood, or any solid material that can be drilled.

The clip, moreover, has semi-cylindrical shank portions which are of a length substantially greater than the depth of the preformed circular wall opening, so that the clip, as a whole, has a substantial degree of axial movement in the hole, after the clip has been positioned in the hole.

The clip also has depending semi-frusto-conical heads which are substantially rigid and have little or no flexibility to facilitate their passage through the circular wall opening.

A further advantage of the aforesaid clip is that insertion of the clip into the hole requires that one of the heads be inserted in the hole first, and the second head to be then inserted into the hole, as by means of a screw driver, so that not only is the cable distorted to some extent during insertion, but considerable care is required in aligning the second head with the first head during insertion.

The present invention has, as its primary object, the provision of a cable support clip of the character described, which overcomes all of the disadvantages of the aforesaid clip.

Another object of the invention is to provide a clip of the character described, which is especially adapted for use in a blind or bottomed hole in concrete, concrete block, wood, or any solid material that can be drilled.

A further object of the invention is to provide a clip of the character described, which is characterized by the provision therein of easily flexible fins, which flex to permit easy insertion of the clip into the hole, and which fins, after insertion, are effective to prevent withdrawal or removal of the clip from the hole.

A further object of the invention is to provide a clip of the character described, which is fully assemblable with the cable prior to insertion of the shank portions of the clip into the hole, and in which both shank portions are simultaneously passed into the hole.

A further object of the invention is to provide a clip of the character described, having novel means for interlocking the shank portions or halves against axial displacement relatively to each other.

A still further object of the invention is to provide a clip of the character described, having means for preventing distortion of or damage to the cable embracing head of the clip during securement of the clip in the hole.

Other objects and advantages of my invention will be apparent during the course of the following description.

In the accompanying drawings forming a part of this specification, and in which like numerals are employed to designate like parts throughout the same, FIG. 1 is an elevational view of a clip embodying the invention;

FIG. 7 is a view similar to FIG. 1, but showing the clip embracing a cable, and with the shank portions thereof inserted in a blind hole in concrete or the like.

Figure 1:
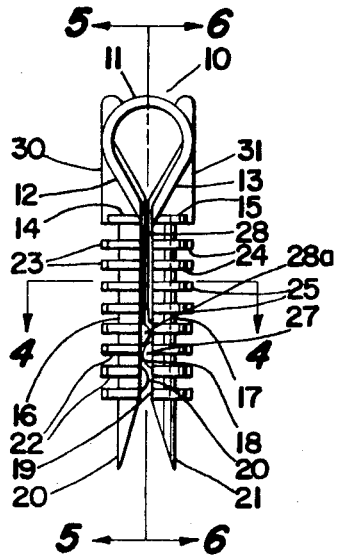

Referring more particularly to FIGS. 1 to 6 inclusive of the drawings, the clip, which is preferably molded in a single piece, from a thermoplastic material, such, for example, as nylon, comprises a head, generally designated by reference numeral 10, having an arcuate upper portion 11, side walls 12 and 13 which converge toward each other, in a downward direction, and which terminate in planar or base portions 14 and 15.

Figure 4:
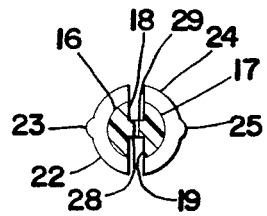
FIG. 4 is a transverse cross-sectional view, taken on the line 4—4 of FIG. 1.

Below the base portions 14 and 15, the clip is provided with spaced shank portions or halves 16 and 17, which are of substantially semi-cylindrical form, with the space between these shank portions or halves being defined by flat walls 18 and 19 which are parallel with each other, as best seen in FIG. 4.

Figure 2:
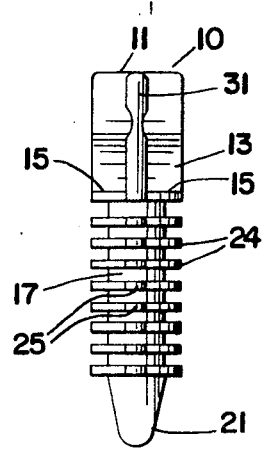
FIG. 2 is an elevational view of the clip, as viewed from the right side of FIG. 1.
Figure 3:
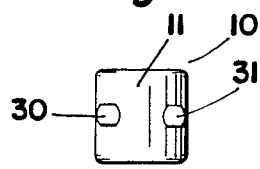
FIG. 3 is a top plan view of the clip of FIG. 1.

The shank portions 16 and 17 terminate respectively at their lower ends in portions 20 and 21, of wedge-like conformation, as best seen in FIGS. 1 and 2.

The portion 16 of the shank is provided with a series of axially-spaced relatively thin flexible fins 22, which are of arcuate contour, as shown in FIG. 4, and which, in their unstressed condition, lie in parallel planes perpendicular to the axis of the clip. The fins 22 are provided intermediate their ends with outwardly extending tongues or tabs 23, which are coplanar with the fins 22.

The portion 17 of the shank is similarly provided with a series of axially-spaced relatively thin flexible fins 24, which are of arcuate contour, as shown in FIG. 4, and which, in their unstressed condition, lie in parallel planes perpendicular to the axis of the clip. The fins 24 are coplanar with the fins 22, which are adjacent thereto, and are provided intermediate their ends with outwardly extending tongues or tabs 25, which are coplanar with the fins 24.

Figure 5:
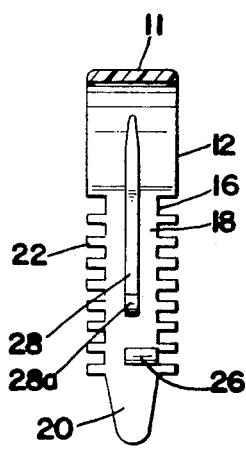
FIG. 5 is a longitudinal cross-sectional view, taken on the line 5—5 of FIG. 1.
Figure 6:
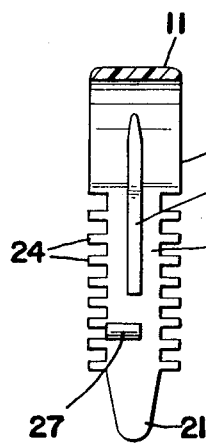
FIG. 6 is a longitudinal cross-sectional view, taken on the line 6—6 of FIG. 1.

For the purpose of interlocking the shank portions 16 and 17 against axial movement relatively to each other, when in the position shown in FIG. 1, the face 18 of the shank portion 16 is provided with a transverse rib 26 which extends from one edge of the face 18 to a point slightly beyond or past the center line of this face, as seen in FIG. 5. The face 19 of the shank portion 17 is provided with a similar rib 27 which extends from that edge of the face 19 which is opposite to the edge of the face 18 from which the rib 26 extends, and to a point slightly beyond or past the center line of the face 19. The rib 27 is also displaced vertically from the rib 26, as best seen in FIG. 1.

The face 18 of the shank portion 16 is also provided with a flat rib 28, which extends centrally of the face 18 from a point spaced vertically from the rib 26, the rib 28 also extending along the inner face of the side wall 12 of the head of the clip. The rib 28 termiantes at its lower end in a rib-like locking element 28a, which projects into the space between the shank portions 16 and 17.

The face 19 of the shank portion 17 is similarly provided with a flat rib 29, which extends centrally of the face 19 from a point spaced vertically from the rib 27, the rib 29 also extending along the inner face of the side wall 13 of the head of the clip. The rib 29 terminates at its lower end at a point which is just above the locking element 28a, when the shank portions are in the position shown in FIG. 1.

For the purpose of reinforcing the head of the clip, as well as to avoid distortion of or damage to the head of the clip, when the clip is being secured in a blind hole, the head of the clip is provided with ribs 30 and 31 which lie in a plane diametrically of the head, at the mid-point of the length of the head, and which extend from the base portions 14 and 15 of the head upwardly to points which are substantially co-planar with the upper end of the portion 11 of the head.

In the use of the clip, which can be best described with reference to FIG. 7, reference letter W indicates a solid wall or support having a blind hole H drilled therein. The hole H is of a diamter which is slightly less than the distance between the outer edges of the tongues or tabs 22 and 25 of the clip.

Figure 7:
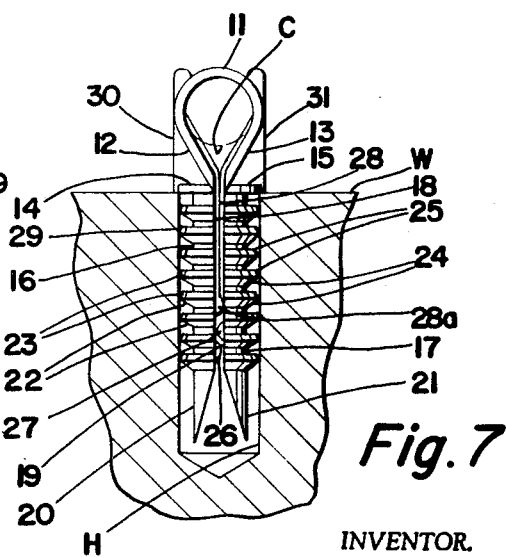

Prior to insertion of the clip into the hole H, the shank portions of the clip are spread apart to permit insertion of the cable C therebetween and to the position shown in broken lines in FIG. 7, wherein the head of the clip embraces the cable.

The shank portions of the clip are then permitted to resume their normal unstressed position, which is shown in FIG. 1. In this position, the ribs 26 and 27 and locking element 28a are interlocked relatively to each other in the manner best seen in FIGS. 1 and 7, so that when the clip is secured in the hole H, the shank portions 16 and 17 cannot be displaced axially relatively to each other during such securement.

The clip is then driven into the hole H to the position shown in FIG. 7, as by means of a hammer or similar tool.

In the couse of the clip being thus driven into the hole H, and since, as previously stated, the diameter of the hole H is slightly less than the distance between the outer edges of the tongues or tabs 23 and 25, the fins 22 and 24 will be flexed by the wall of the hole to assume a stressed conical form, as shown in FIG. 7, in which position or form, the fins or tabs will resist any attempt to remove the clip from the hole.

The clip is driven into the hole until the ribs or webs 30 and 31 come into engagement with the upper surface of the wall W, so that these ribs or webs act as stops to determine the extent into which the clip is driven into the hole.

At the same time, the ribs or webs hammer and 31 take the effect of the hamteR blow or blows and thus act to prevent distortion of or damage to the head of the clip, as well as possible damage to the cable C.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. A cable support clip of the character described, comprising a head adapted to embrace a cable or the like, spaced shank portions depending from said head, axiallY-spaced flexible fins extending from said shank portions, the space between said shank portions being defined by flat walls which are substantially parallel with each other, and means extending from said flat walls into said space and interlocked with each other whereby axial movement of said shank portions relatively to each other in either direction is prevented.

2. A cable support clip, as defined in claim 1, wherein said means comprises ribs extending diametrically of said shank portions.

3. A cable support clip, as defined in claim 1, including means associated with the head of the clip for resisting distortion of or damage to said head when struck with a hammer or the like, said distortion resisting means comprising ribs or webs extending diametrically to the axis of said head.

4. A cable support clip, as defined in claim 1, wherein said fins are of semi-circular shape and are provided with tabs or tongues extending from their outer edges.

5. A cable support clip of the character described, comprising a head adapted to embrace a cable or the like, spaced shank portions extending from said head, axially-spaced flexible fins extending from said shank portions, the space between said shank portions being defined by flat walls which are parallel with each other, said walls being provided with means which are interlocked to prevent axial movement of the shank portions relatively to each other, and means associated with the head of the clip for resisting distortion of or damage to said head when struck with a hammer or the like, said last-named means comprising ribs or webs extending diametrically to the axis of said head.

6. In combinAtion with a wall having a blind hole therein, a cable support clip for securing a cable or the like to said wall, said clip having a head adapted to embrace said cable, spaced shank portions depending from said head, axially-spaced flexible fins extending from said shank portions, said fins adapted to assume a conical form when said shank portions are driven into said hole, whereby the wall of said hole resists any effort to withdraw said shank portions from said hole, the space between said shank portions bei0g defined by flat walls which are substantially parallel with each other, and means extending from said flat walls into said space and interlocked with each other whereby axial movement of said shank portions relatively to each other in either direction is prevented.

7. The combination, as defined in claim 6, wherein said means comprises ribs extending diametrically across said shank portions.

8. The combination, as defined in claim 6, including means associated with the head of said clip for resisting distortion of or damage tO said head and cable when said head is struck with a hammer during insertion of said shank portions, said distortion-resisting means comprising ribs or webs extending diametrically to the axis of said head.

9. The combination, as defined in claim 6, wherein said fins are of semi-circular shape and are provided with tabs or tongues extending from their outer edges.

10. In combination with a wall having a blind hole therein, a cable support clip for securing a cable or the like to said wall, said clip having a head adapted to embrace said cable, spaced shank portions depending from said head, axially-spaced flexible fins extending from said shank portions, said fins adapted to assume a conical form when said shank portions are driven into said hole, whereby the wall of said hole resists any effort to withdraw said shank portions from said hole, the space between said shank portions being defined by flat walls which are parallel with each other, said walls being provided with means which are interlocked to prevent axial movement of the shank portions relatively to each other, and means associated with the head of the clip for resisting distortion of or damage to said head when struck with a hammer during insertion of said shank portions into said hole, said distortion-preventing means comprising ribs or webs extending diametrically to the axis of said head.

* * * * *